United States Patent Office 2,774,022
Patented Dec. 11, 1956

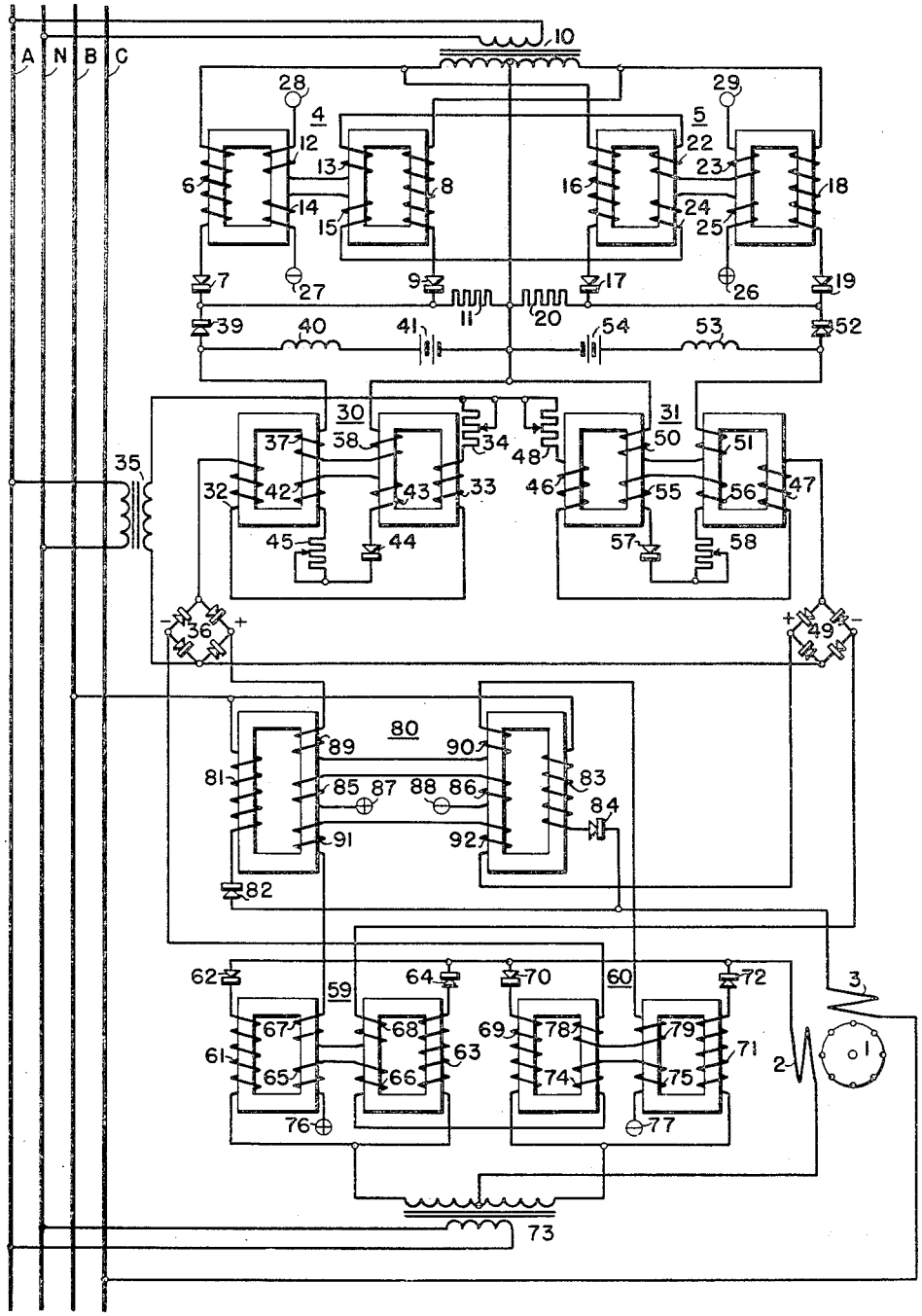

2,774,022

MOTOR CONTROL SYSTEM

Franklin S. Malick, Milwaukee, Wis., assignor to Westinghouse Electric Corporation, East Pittsburgh, Pa., a corporation of Pennsylvania Application June 15, 1953, Serial No. 361,653

5 Claims. (Cl. 318—207)

This invention applies to motor control systems and more particularly to the control of both phases of a two phase motor.

In prior methods of control for two phase motors a constant voltage is applied to one motor winding while the polarity and amplitude of the voltage applied to the other winding are varied to vary the output torque of the motor. In this method of operation, the output torque is proportional to the voltage applied to the control phase. The power input to the fixed phase remains approximately constant even when the output torque is zero.

Controlling both phases of a two phase motor will reduce the power consumption of the circuit and the heating of the motor. Both results are extremely desirable but if the voltage of both phases is varied in proportion to the control signal the output torque would be proportional to the square of the control signal which is not desirable. The present invention controls both phases with a non-linear voltage approximately proportional to the square root of the control voltage and therefore the output torque is substantially proportional to the control voltage.

One object of this invention is to provide a control system having two outputs, each being approximately a function of the square root of a control signal.

Another object of this invention is to provide a control system for a two phase motor whereby an output torque is obtained which is substantially proportional to a control signal when both phases of the motor have a variable voltage applied.

A further object of this invention is to provide a control system of the character referred to wherein both phases of a two phase motor are controlled approximately in proportion to the square root of a control signal.

The objects recited are merely illustrative. Other objects and advantages will become more apparent from a study of the following specification and accompanying drawing in which:

The figure is a diagrammatic showing of a preferred circuit arrangement of this invention.

With specific reference to the form of the invention illustrated in the drawing, the numeral 1 represents the armature of a two phase motor having a reversing phase winding 2 and a non-reversing phase winding 3. The control system for the two phase motor comprises a pair of magnetic amplifiers 4 and 5 connected preferably in push pull arrangement.

Both of the magnetic amplifiers 4 and 5 have their circuits connected in a full wave connection, that is, the magnetic amplifier 4 has a main winding 6 connected in series with a saturating rectifier 7 and a main winding 8 connected in series with a saturating rectifier 9. The saturating rectifiers 7 and 9 are connected to a common terminal. The series circuits containing the main windings 6 and 8 and their associated saturating rectifiers 7 and 9, respectively are connected to opposite terminals of a power source which is shown as the secondary of transformer 10. The common terminal between the saturating rectifiers 7 and 9 is connected to a load resistor 11 which is connected to the mid tap of the secondary of transformer 10. The magnetic amplifier 4 also has control windings 12 and 13 and bias windings 14 and 15.

The magnetic amplifier 5 has a main winding 16 connected in series with the saturating rectifier 17 and a main winding 18 connected in series with the saturating rectifier 19. The saturating rectifiers 17 and 19 are connected to a common terminal which in turn is connected to the load resistor 20. The opposite end of the load resistor 20 is connected to the mid tap of the secondary of transformer 10. The opposite ends of the series circuits containing the main windings 16 and 18 and the saturating rectifiers 17 and 19, respectively are connected to the opposite terminals of the secondary of the transformer 10. The magnetic amplifier 5 has control windings 22 and 23 and bias windings 24 and 25. The bias windings 14 and 15 of the magnetic amplifier 4 and 24 and 25 of the magnetic amplifier 5 are connected in series with each other between the positive and negative terminals 26 and 27, respectively of a biasing source. The control windings 12 and 13 of the magnetic amplifier 4 and 22 and 23 of the magnetic amplifier 5 are also connected in series with each other and are connected between terminals 28 and 29 which are adapted to be energized in accordance with the desired motor torque and direction of rotation. It will be seen that if the current in the control windings 22 and 23 is such as to saturate the cores of magnetic amplifier 5, then the current in the control windings 12 and 13 will be such as to desaturate the cores of the magnetic amplifier 4.

The bias for the amplifiers 4 and 5 are adjusted so that both amplifiers are cut off with no control signal applied between terminals 28 and 29. If a D. C. control voltage is applied to the input terminals 28 and 29 with the terminal 29 positive, the input amplifier 5 will increase its output so that a voltage will appear across the load resistor 20. Since these amplifiers are self-saturating amplifiers and have a polarity sense, the magnetic amplifier 4 will remain at approximately zero output if the output of the magnetic amplifier 5 increases.

A second stage of magnetic amplifiers is provided which consists of the magnetic amplifiers 30 and 31. The magnetic amplifier 30 has two main windings 32 and 33 which are connected in series with each other through an adjusting potentiometer 34 to one side of a power source shown as the transformer 35. The other side of the series connected main windings 32 and 33 are connected to an input terminal of rectfiers 36 connected in full bridge arrangement. The opposite input terminal of the rectifiers connected in full bridge arrangement is connected to the remaining terminal of the secondary of the transformer 35. A pair of control windings 37 and 38 is provided in series with a blocking rectifier 39 across the load resistor 11 of the magnetic amplifier 4. The blocking rectifier 39 is poled in such a manner that no forward current may be carried by the control source. A constant current source is connected in parallel with the control windings 37 and 38 which consists of a high impedance 40 and a voltage source 41. The constant current source is required since some current is needed during non-conduction to assure the effect of the constraint imposed by the control voltage. A path for control circuit current during the conduction periods is provided by the conduction windings 42 and 43 in series with each other, a rectifier 44 and a limiting potentiometer 45.

The magnetic amplifier 31 has main windings 46 and 47 connected in series with each other and a limiting potentiometer 48 between one terminal of the secondary of the transformer 35 and one input terminal of a set of rectifiers 49 connected in full bridge arrangement.

The opposite terminal of the rectifiers 49 connected in full bridge arrangement is connected to the opposite terminal of the secondary of the transformer 35. The magnetic amplifier 31 has control windings 50 and 51 connected in series with each other and blocking rectifier 52 across the load resistor 20 of the magnetic amplifier 5 to insure that no forward current is carried by the control source. A constant current source is also provided for the magnetic amplifier 31 which consists of a high impedance 53 and a direct current voltage source 54. Windings 55 and 56 are wound on the cores of the magnetic amplifier 31 and are connected in series with each other. A blocking rectifier 57 and a limiting potentiometer 58 provide a path for control circuit currents during the conduction period.

The magnetic amplifiers 30 and 31 are known as "New Series" amplifiers and have a non-linear output which is approximately proportional to the square root of the control voltage. A discussion of the "New Series" magnetic amplifier, its operation and theory is given in AIEE Transactions 1951, volume 70, pages 1214 through 1222, in an article entitled "On the mechanics of magnetic amplifier operation" by Robert A Ramey.

In this article attention is particularly invited to Fig. 14 which depicts the non-linear transfer characteristic of the "New Series" magnetic amplifier. The characteristic shown is not truly a square root curve having ordinates for given abscissa which are less than the corresponding square root ordinates, plotted to the same scale, up to about 20 volts of control voltage and having ordinates slightly exceeding corresponding square root ordinates over the range of about 20 to 70 volts of control voltage. However, for the purposes of this invention the characteristic is sufficiently close. By careful selection of the circuit parameters the slope may be changed without changing the order of curvature, thereby more closely approximating the desired characteristic.

Another pair of magnetic amplifiers 59 and 60 is provided, each having its circuits connected in doubler arrangement. The magnetic amplifier 59 has a main winding 61 connected in series with the saturating rectifier 62 and main winding 63 connected in series with saturating rectifier 64. The two circuits containing the main windings are connected in parallel with each other. The magnetic amplifier 59 also contains biasing windings 65 and 66 and control windings 67 and 68. The magnetic amplifier 60 contains a main winding 69 in series with a saturating rectifier 70 and a main winding 71 in series with a saturating rectifier 72 and the circuits of the main windings 69 and 71 are connected in parallel with each other. One common terminal of each of the parallel circuits which contain the main windings 61 and 63, and 69 and 71 is connected to one side of the reversing phase winding 2. The other side of the reversing phase winding 2 is connected to the center tap of the secondary of transformer 73. The common terminal between the main windings 61 and 63 of the amplifier 59 is connected to one terminal of the secondary of the transformer 73 while the opposite terminal of the secondary of the transformer 73 is connected to the remaining terminal of the parallel circuit containing the main windings 69 and 71. The magnetic amplifier 60 has biasing windings 74 and 75 which are connected in series with each other and the biasing windings 65 and 66 of the magnetic amplifier 59 through the positive and negative terminals 76 and 77 of a bias source. Magnetic amplifier 60 also has control windings 78 and 79.

A non-reversing magnetic amplifier 80 has its circuits connected in a doubler arrangement. It has a main winding 81 connected in series with a saturating rectifier 82 and a main winding 83 connected in series with a saturating rectifier 84. The circuits containing the main windings 81 and 83 are connected in parallel with each other and the parallel circuit has one terminal connected to one line B of a three phase four line supply. The opposite terminal is connected in series with the non-reversing phase winding 3 to a second line C of the three phase four line supply. The magnetic amplifier 80 has biasing windings 85 and 86 connected between the positive and negative terminals 87 and 88 of a suitable biasing source. Control windings 89 and 90 are connected in series with each other to one output terminal of the rectifiers 36 in full bridge arrangement and also in series with the control windings 78 and 79 of the magnetic amplifier 60 to the opposite output terminal of the rectifiers 36 in full bridge arrangement. The magnetic amplifier 80 also has control windings 91 and 92 which are connected in series with each other and control windings 67 and 68 of the magnetic amplifier 59 across the output terminals of the rectifiers 49 in full bridge arrangement.

When the magnetic amplifier 5 is conducting, an output voltage appears across the output resistor 20. The magnetic amplifier 31 conducts and thus supplies a voltage across the output terminals of the rectifier 49 in full bridge arrangement which is approximately proportional to the square root of the control voltage on the magnetic amplifier 31, that is, the voltage across the output 20 of the magnetic amplifier 5. The output voltage of the rectifiers 48 in full bridge arrangement is then applied to the control windings 67 and 68 of the magnetic amplifier 59 and the control windings 91 and 92 of the magnetic amplifier 80 to make the magnetic amplifier 59 and the magnetic amplifier 80 conduct and supply control voltages to their respective phase windings which are approximately proportional to the square root of the control voltage across the load resistor 20 of magnetic amplifier 5 which is proportional to the control voltage applied between the terminals 28 and 29.

If it is assumed that the conduction of the magnetic amplifier 59 applies a voltage to the reversing phase winding 2 in such a sense as to cause a counterclockwise rotation of the armature 1 of the two phase motor then conduction of the magnetic amplifier 60 will apply a voltage in an opposite sense and thus cause the armature 1 of the two phase motor to rotate in a clockwise direction. This is accomplished by applying a control voltage between the terminals 28 and 29 of such a polarity that the terminal 28 is positive and terminal 29 is negative. Thus the magnetic amplifier 4 will conduct and an output voltage will appear across the load resistor 11. The series magnetic amplifier 30 will conduct and thus cause a voltage across the output terminals of the rectifiers 36 in full bridge arrangement which is approximately proportional to the square root of the control signal applied between the terminals 28 and 29. The rectifiers 36 in full bridge arrangement will then supply a control voltage across the control windings 89 and 90 of the magnetic amplifier 80 in series with the control windings 78 and 79 of the magnetic amplifier 60.

The control windings 91 and 92 of the magnetic amplifier 80 and the control windings 89 and 90 of the magnetic amplifier 80 are wound such that a control current through either set of control windings will cause the magnetic amplifier 80 to conduct and supply the non-reversing phase winding 3 with a voltage which is approximately proportional to the square root of the control voltage applied between the terminals 28 and 29. The voltage across the non-reversing phase winding 3, however, is always of the same polarity. When a control voltage is applied to the control windings 78 and 79 of the magnetic amplifier 60, the magnetic amplifier 60 conducts and a voltage is applied across the reversing phase winding 2, which is of such a polarity as to make the armature 1 of the two phase motor rotate in a clockwise direction and which is of such a magnitude that the voltage applied to the reversing phase winding 2 is approximately proportional to the square root of the control voltage applied between input terminals 28 and 29 of the control windings 12 and 13 and 22 and 23 of the magnetic amplifiers 4 and 5 respectively.

Since the motor torque is equal to the product of the voltages on the two phase windings and since the voltages applied to the two phase windings in this application are approximately proportional to the square root of the control voltage which determines the control voltage in accordance with which it is desired that the output torque of the two phase motor will vary, then it is obvious that the motor torque will vary substantially in proportion to the desired control voltage.

Since the magnetic amplifiers 5, 31 and 59 conduct at one time and cause the motor armature 1 to rotate in a counterclockwise direction, they may be considered a counterclockwise channel and since the magnetic amplifiers 4, 30 and 60 conduct at one time and cause the armature 1 of the two phase motor to rotate in a clockwise direction, they may be considered a clockwise channel. The magnetic amplifier 80 conducts when either the magnetic amplifier 4 or the magnetic amplifier 5 conducts and the output of the magnetic amplifier 80 has the same polarity regardless of which magnetic amplifier or which channel conducts.

The circuit in the figure is set up to receive power from a three phase, four wire system. The 90 degree phase relationship between the reversing phase winding 2 and the non-reversing phase winding 3 is obtained by having the non-reversing power amplifier 80 receive its power from two lines of a three phase system (B and C) while the reversing phase power amplifier receives power from the remaining line and neutral (A and N).

While in accordance with the patent statutes one best known embodiment of the invention has been illustrated and described in detail, it is to be particularly understood that the invention is not limited thereto or thereby but that the inventive scope includes all equivalents.

I claim as my invention:

1. A two phase motor control system comprising, a two phase motor having a pair of control windings, a pair of amplifiers having respective direct current output circuits and a common direct current input circuit, said pair of amplifiers being selectively conductive in dependence of polarity of said common direct current input circuit, a pair of non-linear amplifiers having respective input circuits connected to said respective output circuits and having respective direct current output circuits in which the electrical output is approximately proportional to the square root of the electrical input thereto, reversible phase alternating current amplifier means having output circuit means connected to one motor control winding and having a pair of input circuits respectively connected to said respective direct current output circuits of said non-linear amplifiers, and a non-reversing phase, alternating current amplifier having an output circuit connected to the remaining motor control winding and having a pair of input circuits respectively connected to said respective direct current output circuits of said non-linear amplifiers.

2. A two phase motor control system comprising, a two phase motor having a pair of windings, a pair of selectively controlled direct current amplifier channels having respective non-linear direct current output circuits and having polarity sensitive direct current input circuit means, said non-linear output circuits respectively producing respective electrical outputs approximately proportional to the square root of the electrical input of said input circuit means, a pair of alternating current amplifiers having respective alternating current parallel connected output circuits of opposite phase relation and having respective input circuits connected to said respective non-linear output circuits for selectively controlling said pair of alternating current amplifiers, a non-reversible phase alternating current amplifier having an alternating current output circuit connected to one of said pair of motor windings and having a pair of input circuits respectively connected to said respective non-linear output circuits, and circuit means connecting the other of said pair of windings to said parallel connected alternating current output circuits.

3. A two phase motor control system comprising, a two phase motor having a pair of windings, a direct current amplifier channel having a non-linear direct current output circuit and having a controllable direct current input circuit, said non-linear output circuit producing an electrical output substantially proportional to the square root of the electrical input of said input circuit, a pair of alternating current power amplifiers having respective direct current input circuits connected to and energized by the electrical output of said non-linear output circuit and having respective alternating current output circuits respectively connected to the corresponding winding of said pair of windings to energize said pair of windings.

4. A two phase motor control system comprising, a two phase motor having a pair of motor windings, a direct current amplifier channel having a non-linear direct current output circuit and having a controllable direct current input circuit, said non-linear output circuit producing an electrical output substantially proportional to the square root of the electrical input of said input circuit, a three phase alternating current supply circuit having three lines and a neutral line, a pair of alternating current magnetic power amplifiers each having a main winding circuit and a direct current control winding circuit, circuit means connecting each control winding circuit to said non-linear output circuit, circuit means including one of said pair of motor windings connecting one main winding across two lines of said three phase system, and circuit means including the other of said pair of motor windings connecting the other main winding to the remaining line of said three phase system and said neutral line.

5. A two phase motor control system comprising, a two phase motor having a pair of windings, a direct current amplifier channel having a non-linear direct current output circuit and a controllable direct current input circuit, said non-linear output circuit producing an electrical output substantially proportional to the square root of the electrical input of said input circuit, a pair of alternating current power amplifiers having respective direct current input circuits connected to said non-linear output circuit and having respective alternating current power circuits connected to the corresponding winding of said pair of windings, circuit means applying alternating current to one alternating current power circuit, and circuit means applying alternating current to the other of said alternating current power circuits, which latter alternating current is shifted ninety degrees in phase with respect to the alternating current supplied to said one alternating current circuit.

References Cited in the file of this patent

UNITED STATES PATENTS

| 2,559,513 | Palmer | July 3, 1951 |
| 2,561,319 | Runyan | July 17, 1951 |
| 2,546,271 | McKenney | Mar. 27, 1951 |